Nov. 29, 1927.

B. P. JOYCE 1,651,131

PACKING

Filed June 4, 1926

INVENTOR
Bryan P. Joyce,

Patented Nov. 29, 1927.

1,651,131

UNITED STATES PATENT OFFICE.

BRYAN P. JOYCE, OF DAVENPORT, IOWA.

PACKING.

Application filed June 4, 1926. Serial No. 113,711.

My invention has reference, in general terms, to packing, and more particularly it relates to metallic packing as applied to hydro-pneumatic recuperator mechanisms for gun carriages and similar high pressure machines.

The principal object of my invention is to provide a metallic packing which may be substituted for non-metallic packing in existing machines, without causing a change in the functioning of the machine. In existing hydro-pneumatic recuperator mechanisms for gun carriages the packing friction is very great, and, were a low friction packing such as is disclosed in my Patents 1,583,931 and 1,584,700 installed in such a mechanism, without expensive changes within the mechanism itself, the low friction of the packing would cause the mechanism to malfunction by permitting the gun to over-recoil. Therefore, in addition to the above mentioned low friction packing, I provide means to supply friction, as will be hereinafter disclosed.

Another object of my invention is to provide an all metal packing which will not attack surrounding parts when installed for use, as does rubber, leather and similar packing materials.

A further object of my invention is to provide a packing which will not deteriorate in storage.

Another object of my invention is to provide a packing which will improve a polished steel surface with which it is in moving contact.

To these and other ends, my invention consists in the construction, arrangement and combination of parts, described hereinafter and pointed out in the claims forming a part of this specification.

One embodiment of my invention is illustrated by way of example in the accompanying drawing, in which, Fig. 1 is a side view of the packing ring.

Figure 1:
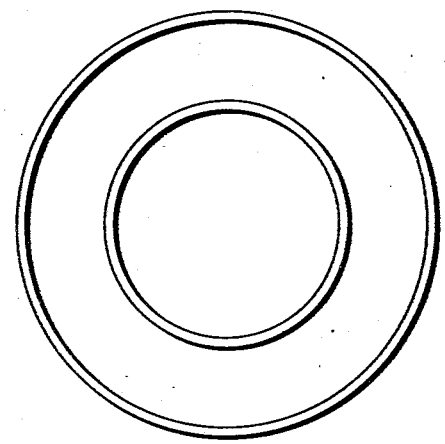
Figure 2:
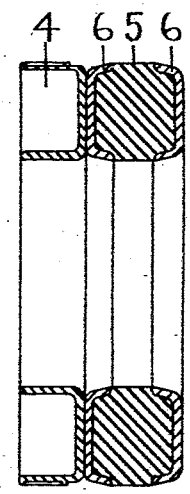
Fig. 2 is a sectional view of the packing ring.
Figure 3:
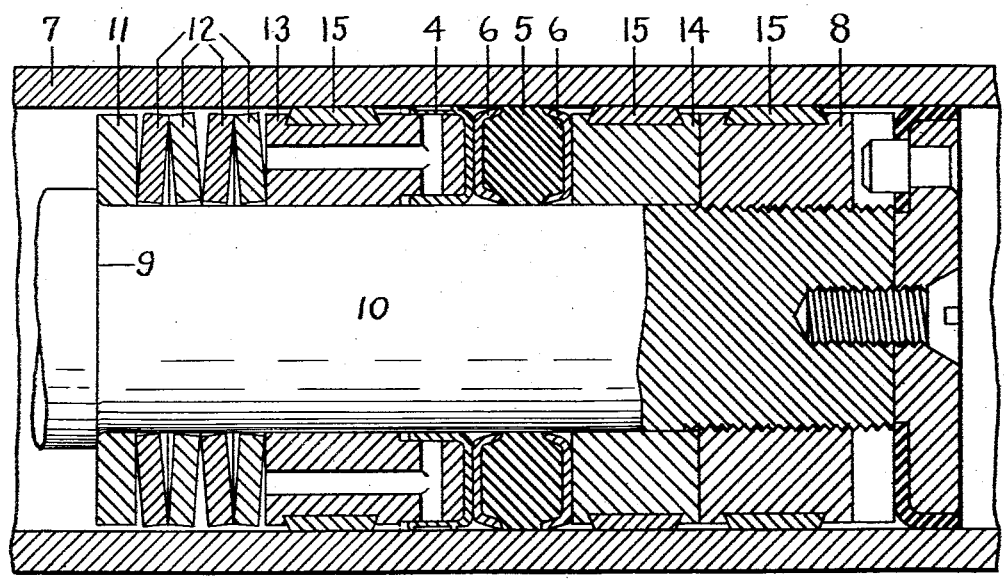
Fig. 3 is a longitudinal section showing the packing as applied to a piston.

In the drawing wherein like characters of reference designate like or similar parts, 4 indicates a packing ring as shown in my Patent No. 1,583,931, which in the present invention is utilized as the sealing element. 5 indicates a ring of very soft metal such as tin or lead which is restrained between two cup rings 6 of harder metal such as coin silver or copper, this construction being covered by my Patent 1,635,482, dated July 12, 1927; which in the present invention is utilized as a friction element. While this construction may be used as a sealing element to pack either a stationary or slow moving joint, it is not sufficiently resilient to seal a fast moving joint such as is made by a recoil piston with its cylinder.

7 indicates a cylinder in which the packing is assembled between the nut 8 and the shoulder 9 formed on the piston 10. The ring 11 provides a seat for the belleville springs 12 which exert pressure upon the ring 13 which supports the packing ring 4 as shown in my Patent No. 1,584,700.

The ring 5 between its cup rings 6 is held between the packing ring 4 and the follower ring 14 which in turn is seated against the nut 8. The rings 13 and 14 and the nut 8 are provided with anti-friction bands 15 for centering the piston.

As may be readily seen the ring 4 acts under pressure of the fluid within the cylinder 7 as disclosed in my Patent No. 1,583,931, forming an efficient seal for fast moving joints such as is made by a recoil piston with its cylinder. The soft metal 5 is acted upon over the whole of its annular area by the pressure of the fluid within the cylinder as well as the pressure exerted by the belleville springs; and is restrained from flowing under such pressure by the cup rings 6, also the cup rings 6 prevent flow of the soft metal along the cylinder wall due to frictional contact therewith. By adjusting the nut 8 the pressure exerted by the belleville springs may be varied, and so vary the frictional pressure of the soft metal with the cylinder wall, thereby, permitting the friction of the packing to be adjusted as desired. Also the belleville springs automatically compensate for any loss of soft metal due to wear until such time as it is expedient to adjust the nut 8.

I claim:

1. The combination with a casing and a reciprocable member mounted therein, of a plurality of metallic rings comprising inner, outer and intermediate rings embracing said member, a resilient element between the inner and intermediate rings, a packing ring having circumferential flanges which are fitted to the outer end of the intermediate ring, said intermediate ring being provided with a series of longitudinal ducts and intersecting transverse ducts for directing a pressure medium against the approximate center of the circumferential flanges of the packing ring, a friction ring comprising a ring of soft metal interposed between two cup rings and embracing the reciprocable member between said packing ring and the outer metallic ring, and adjustable means securing the assembly in place.

2. The combination with a casing and a reciprocable member mounted therein, of a plurality of metallic rings between the casing and member and comprising inner, outer and intermediate rings, a U-shaped metallic sealing ring having its flanges telescoping the intermediate ring, the latter having ducts to permit the pressure fluid to act on said flanges, resilient means between the inner and intermediate rings, a friction ring between the intermediate and outer rings and comprising a ring of soft metal interposed between two cup rings of harder metal, and adjustable means for securing the assembly in place and applying lateral pressure to said friction ring.

3. The combination with a casing and a reciprocable member mounted therein, of a packing assembly for the same comprising a metallic sealing ring having an annular body portion with resilient circumferential flanges projecting from one side of the same, and a friction ring abutting the body portion of the sealing ring and comprising an annular body of soft metal interposed between two harder metal cup rings, spring pressed means for holding the sealing ring against the friction ring and admitting fluid pressure between its flanges, and adjustable means for forcing the friction ring toward the sealing ring and compressing it laterally.

4. The combination of a casing member for a pressure fluid, a reciprocable member therein, two relatively fixed elements between the members and carried by one of them, a movable ring between the members, spring means between the ring and one of the fixed elements to slide the ring toward the other fixed element, a cup ring on the movable ring, the latter having ducts to permit pressure fluid to enter the channel of the cup ring, and a packing ring between said other fixed element and the cup ring to be laterally compressed by both the pressure fluid and the spring means, and thereby expanded radially into frictional contact with one of the members.

5. The combination of a casing member for a pressure fluid, a reciprocable member therein, an element between and fixed to one of the member, a movable ring between the members, a cup ring on the movable ring, the latter having ducts to permit the pressure fluid to enter the channel of the cup ring, and a packing ring between the fixed element and the cup ring to be laterally compressed by the pressure fluid and thereby expanded radially into frictional contact with one of the members.

6. In a packing, a U-shaped metallic sealing ring, a friction element axially alined with the sealing ring and consisting of an annular body of soft metal interposed between two cup rings, spring pressed holding means in the channel of the sealing ring, and means for shifting the friction element laterally against the tension of the spring pressed holding means for varying the friction of said friction element.

7. In a packing, a sealing element, a friction element axially alined therewith, spring means for forcing the sealing element towards the friction element, and means for adjusting the friction of the friction element by shifting both elements axially towards said spring means.

8. A packing for sealing pressure fluids comprising a sealing element, a separate friction element and means for adjusting the friction of the friction element, said sealing element being subject to fluid pressure for its sealing pressure, and said friction element being subject to both fluid pressure and the pressure of said adjusting means for its friction pressure.

9. A packing ring comprising an all metal filler ring, capable of flow under working conditions, restrained from escape at a sealing-contact surface by rings of harder metal.

BRYAN P. JOYCE.